(12) United States Patent
Straka et al.

(10) Patent No.: US 8,576,532 B2
(45) Date of Patent: Nov. 5, 2013

(54) POWER OVER ETHERNET TRANSIENT VOLTAGE SUPPRESSION PATCH PANEL

(75) Inventors: Frank M. Straka, Chicago, IL (US); Masud Bolouri-Saransar, Orland Park, IL (US); Ronald A. Nordin, Naperville, IL (US); Darren J. Reigle, Frankfort, IL (US); Wayne C. Fite, Elmhurst, IL (US)

(73) Assignee: Panduit Corp., Tinley Park, IL (US)

( * ) Notice: Subject to any disclaimer, the term of this patent is extended or adjusted under 35 U.S.C. 154(b) by 1034 days.

(21) Appl. No.: 12/332,900

(22) Filed: Dec. 11, 2008

(65) Prior Publication Data

US 2010/0149709 A1 Jun. 17, 2010

(51) Int. Cl.
*H02H 1/04* (2006.01)

(52) U.S. Cl.
USPC .......................................... 361/119

(58) Field of Classification Search
USPC .......................................... 361/119
See application file for complete search history.

(56) References Cited

U.S. PATENT DOCUMENTS

| | | | |
|---|---|---|---|
| 4,161,008 A | 7/1979 | Zimmerman et al. | |
| 4,532,384 A * | 7/1985 | Keriakos et al. | 379/346 |
| 4,577,255 A | 3/1986 | Martin | |
| 4,661,979 A | 4/1987 | Jakab | |
| 4,726,638 A | 2/1988 | Farrar et al. | |
| 4,799,901 A | 1/1989 | Pirc | |
| 4,823,383 A | 4/1989 | Cardot et al. | |
| 4,878,145 A | 10/1989 | Lace | |
| 5,069,641 A | 12/1991 | Sakamoto et al. | |
| 5,267,071 A * | 11/1993 | Little et al. | 398/162 |
| 5,477,370 A * | 12/1995 | Little et al. | 398/202 |
| 5,581,434 A | 12/1996 | Landler | |
| 5,706,160 A | 1/1998 | Latuszkin et al. | |
| 5,796,781 A * | 8/1998 | DeAndrea et al. | 375/288 |
| 5,872,429 A * | 2/1999 | Xia et al. | 315/194 |
| 6,450,837 B1 | 9/2002 | Givens et al. | |
| 6,671,154 B1 | 12/2003 | DeAndrea et al. | |
| 7,161,786 B2 | 1/2007 | Bencivenga et al. | |
| 2004/0209515 A1 | 10/2004 | Caveney et al. | |
| 2005/0221660 A1 * | 10/2005 | Coffey et al. | 439/404 |
| 2007/0163801 A1 * | 7/2007 | Coffey et al. | 174/250 |
| 2007/0253128 A1 * | 11/2007 | Tiebout et al. | 361/56 |
| 2010/0149709 A1 * | 6/2010 | Straka et al. | 361/91.1 |

* cited by examiner

*Primary Examiner* — Ronald W Leja
(74) *Attorney, Agent, or Firm* — Christopher S. Clancy; Zachary J. Smolinski; Yuri Astvatsaturov

(57) ABSTRACT

A device for providing transient voltage suppression on a Power over Ethernet system is provided. The device includes a transient voltage suppression module. The transient voltage suppression module includes a circuit module, which includes a circuit board and input and output connectors. One or more transient voltage suppression modules may be mounted to a frame to form a transient voltage suppression patch panel, which, in turn, may be mounted to a rack for use in a telecommunications room. The circuit board combines a frequency-variable impedance connected between conductors in a pair and a voltage-variable impedance connected to the frequency-variable impedance, where the voltage-variable impedance is also connected to a chassis and/or an electrical ground.

27 Claims, 7 Drawing Sheets

POWER OVER ETHERNET TRANSIENT VOLTAGE SUPPRESSION PATCH PANEL

FIELD OF THE INVENTION

This invention relates to transient voltage suppression over data lines and networks including Power over Ethernet systems.

BACKGROUND OF THE INVENTION

Voltage surges can be a threat to electronic circuitry, especially in components and systems where continuous functioning is necessary. For example, in an electronically controlled building access system, it is necessary that the system functions continuously to prevent people from being trapped inside the building or locked out of the building in the event of an emergency. Thus, it is important that the electronic equipment used in such systems has protection to prevent the effects of transient voltages. This protection may be achieved by including specialized circuitry within the electronic equipment or by adding transient voltage suppression devices within the system.

With the introduction of Power over Ethernet (PoE), devices such as telephones, door access readers, door sensors, cameras, and wireless access points are being powered using Ethernet network cabling. In the past, separate 120V cabling had to be installed along with communications cabling in order to power and communicate with these types of devices. PoE eliminates the need to run additional power cabling by injecting a DC voltage onto an Ethernet network.

A DC voltage can be injected on Ethernet cabling by using a network switch with PoE capabilities or a PoE injector device. Usually, a PoE injector is used if a network is already installed in a building because it may be costly to change an existing non-PoE switch to a PoE switch. Either device is installed in a network closet or a telecommunications room.

The need for transient voltage suppression on data lines using PoE is driven by the increasing number of Ethernet users wanting to take advantage of the convenience and the cost savings that PoE offers. Additionally, safety standards require transient voltage suppression in this area. For example, Underwriter's Laboratory (UL) published an access system standard under UL 294 titled "Access Control System Units." One aspect of this specification is that listed components are capable of suppressing a transient voltage surge of 2400V/12A on output circuitry.

Local authorities may require access control systems to be UL listed, and for a system to be UL listed, it is important for every component in the system to be UL listed (i.e. power supply, door controller, card reader, etc.).

In the prior art, PoE switches and PoE injector devices are not known to handle the transient voltages stated in UL specifications. Therefore, it would be desirable to provide a device to PoE systems that will accomplish transient voltage suppression and protect the PoE power source.

SUMMARY OF THE INVENTION

The present invention addresses the deficiencies of prior art PoE systems by providing a transient voltage suppression patch panel to protect a PoE switch or a PoE injector that provides power to such systems or devices that are powered by PoE. Consequently, such systems may meet relevant safety standards and run without interruption without the need for additional custom, point-to-point wiring to provide power.

As an example, the transient voltage suppression device may be used in an electronic door access system that controls access to a building or to portions of a building. The device may be placed between a PoE switch or a PoE injector and a door controller. The door controller in turn controls a card reader, a door sensor, and a lock. In the typical system, the door controller, the card reader, the door sensor, and the lock will each have transient voltage protection, which can typically be through surge suppression in the door controller. The device may add transient voltage protection to a PoE switch or a PoE injector, which do not have such protection in the prior art. A transient suppression module of a described embodiment facilitates an operating frequency range with a frequency-variable impedance having low impedance at a low end of a frequency range and a high impedance at a high end of the frequency range. The frequency-variable impedance may use a first inductor connected to a second inductor providing a mutual inductance between said first inductor and said second inductor, wherein said frequency-variable impedance comprises a toroidal transformer with a ferrite wrapped with said first inductor and said second inductor. The transient suppression module provides a first conductor and a second conductor electrically parallel to said first conductor, with the frequency-variable impedance connected between the first and second conductors. The voltage-variable impedance is coupled with the frequency-variable impedance, and the voltage-variable impedance may be connected for example to a chassis, and/or an electrical ground such as earth or other ground.

BRIEF DESCRIPTION OF THE DRAWINGS

The invention will now be more particularly described by way of example with reference to the accompanying drawings. Novel features believed characteristic of the invention are set forth in the claims. The invention itself, as well as the preferred mode of use, further objectives, and advantages thereof, are best understood by reference to the following detailed description of the embodiment in conjunction with the accompanying drawings, in which:

DETAILED DESCRIPTION OF THE EMBODIMENTS

Figure 1:
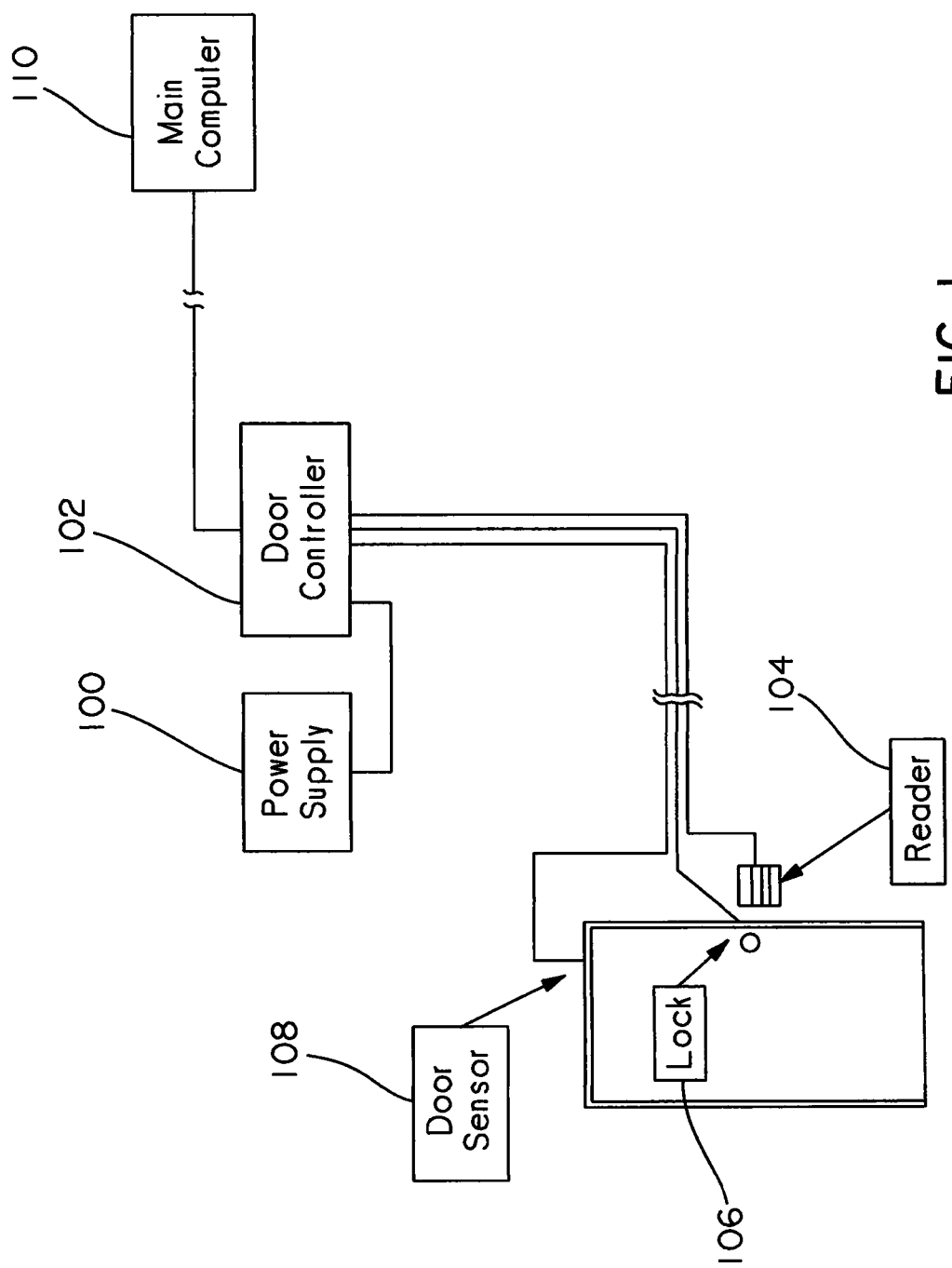
FIG. 1 represents a current door access control configuration without Power over Ethernet.

FIG. 1 shows a typical door access control configuration. The power supply 100 is plugged into a 120V wall outlet and supplies power to the door controller 102. The door controller 102 provides a DC voltage to the reader 104, the lock 106, the door sensor 108, and other accessories. A main computer 110 may be connected to the door controller 102 for updates and monitoring.

Figure 2:
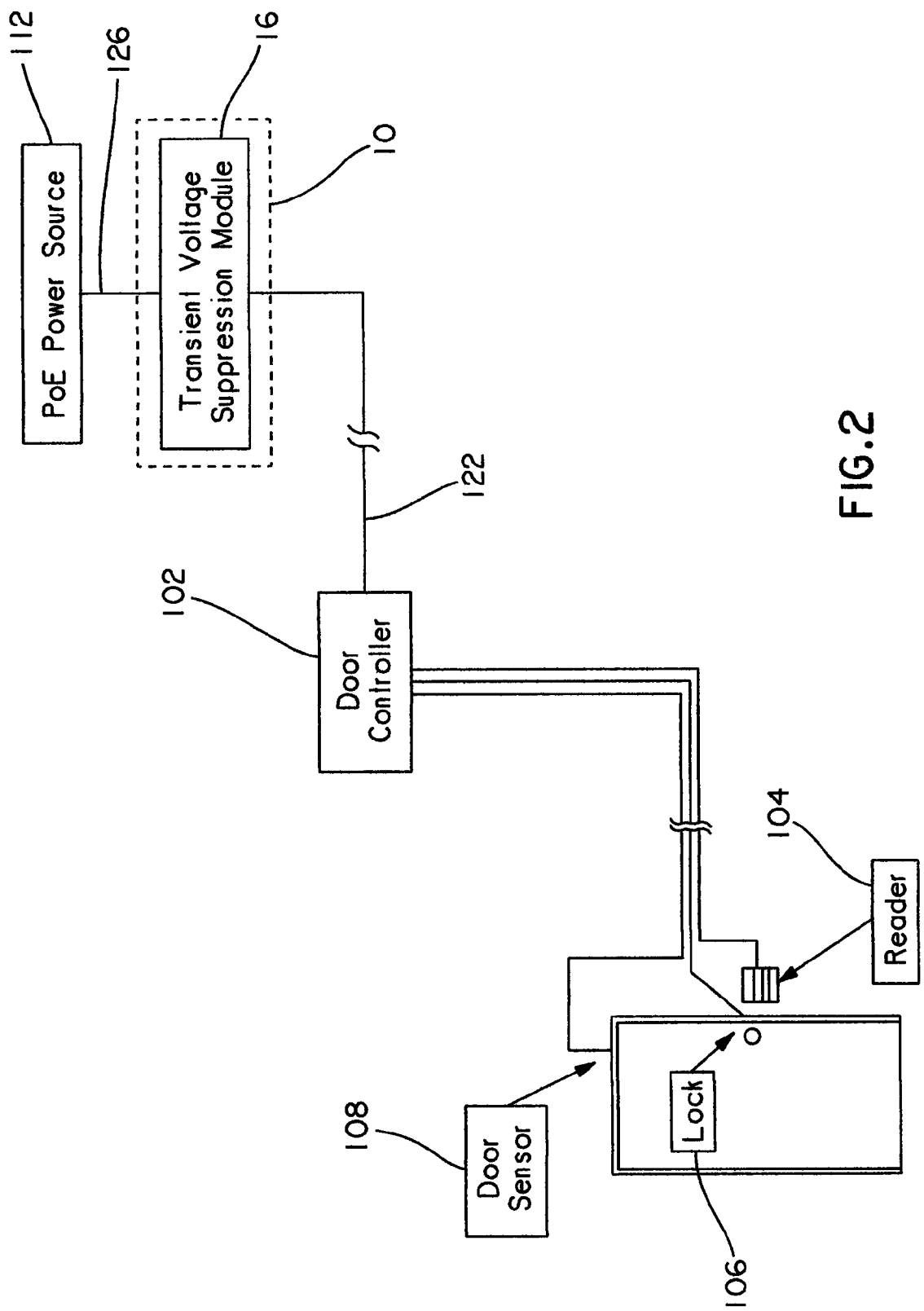
FIG. 2 represents a door access control configuration with Power over Ethernet.

FIG. 2 shows a PoE door access control configuration. This configuration replaces the power supply 100 shown in FIG. 1 with a PoE power source 112, which may be either a PoE switch or a PoE injector. PoE power sources 112 are generally not designed to handle transient voltages. In particular, these switches and injectors are not compliant with UL 294 and UL 497B. Therefore, a transient voltage suppression patch panel 10, which, according to one embodiment, includes up to four transient voltage suppression modules 16, is placed in series with the PoE power source 112 and the door controller 102. The connection between the PoE power source 112 and the transient voltage suppression module 16 is made by using a relatively short patch cable 126 that is not typically subjected to transient voltages. The connection between the transient voltage suppression module 16 and the door controller 102 is made by using a relatively long (up to 90 m) horizontal cable 122 on which transient voltages may be induced.

Figure 3:
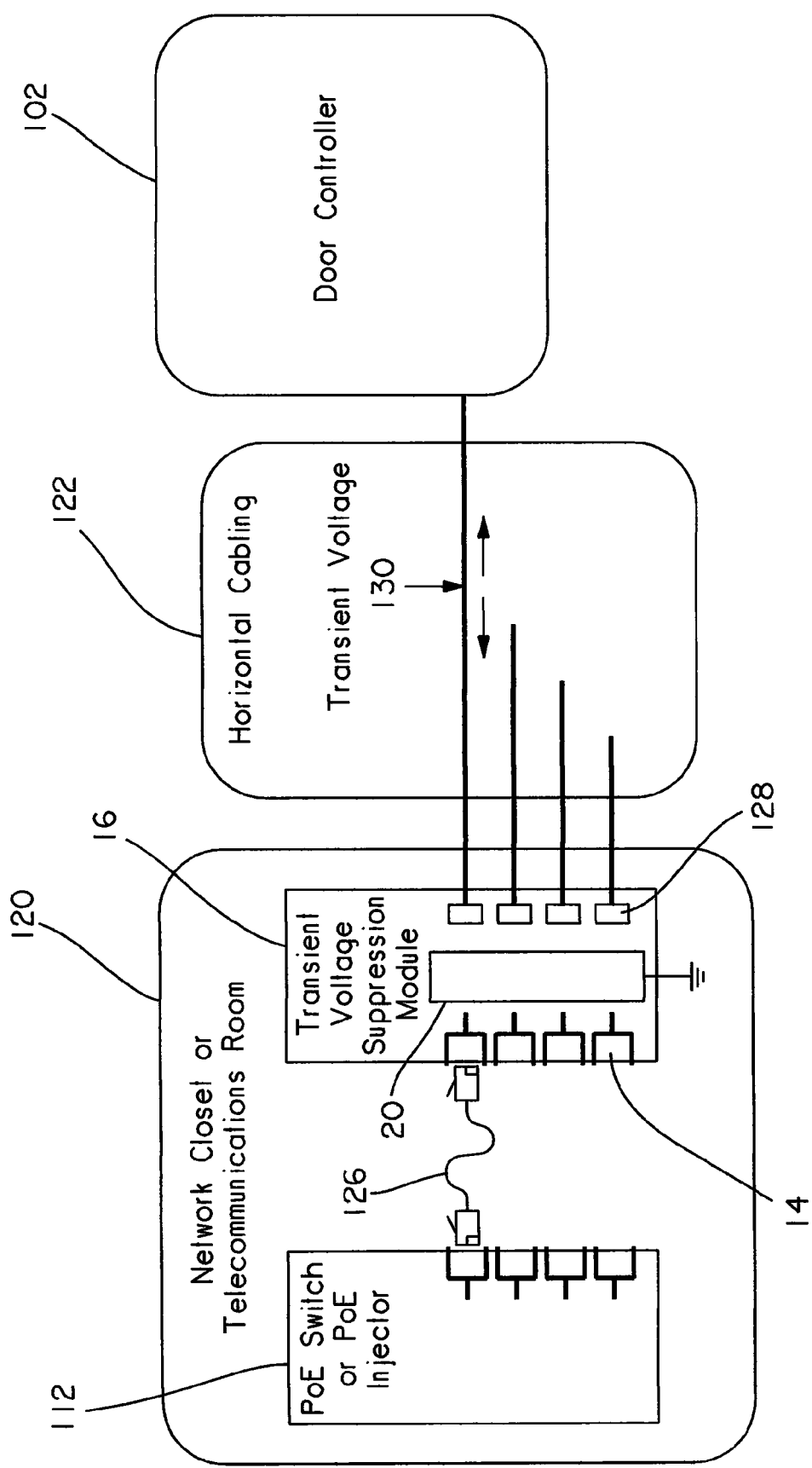
FIG. 3 is a high level schematic of a Power over Ethernet door access control system.

FIG. 3 shows a high level schematic of a Power over Ethernet door access control system. The transient voltage suppression module 16 and the PoE power source 112 are connected using a standard Ethernet cable 126 and housed within a network closet or a telecommunications room 120. The front of the transient voltage suppression module 16 includes standard jack modules 14, such as RJ45 jacks, for connection to the PoE power source 112. The back of the transient voltage suppression module 16 includes 110 punchdown connectors 128 for connecting to the door controller 102 using standard structured Ethernet horizontal cabling 122.

FIG. 3 also illustrates a transient voltage 130 occurring along the horizontal cabling 122 between the transient voltage suppression module 16 and the door controller 102 as illustrated by arrows indicating propagation of the surge. If a transient voltage 130 occurs as shown, the transient voltage suppression circuit module 20 located within the transient voltage suppression module 16 limits the peak voltage and routes the excess surge to ground. In order to keep an uninterrupted power source, the transient voltage suppression circuit module 20 does not clamp directly to ground. If the PoE power source 112 detects a short in the transient voltage suppression module 16 via the Ethernet cabling, which may be the result of the transient voltage suppression module 16 circuitry having been overloaded, it will turn off. This is an undesired response in a door access control system because it is important to have such systems functioning in case of an emergency. By having the transient voltage suppression circuit module 20 clamp to a voltage (approximately 52 volts), the differential voltage seen by the PoE power source 112 will always be at least 52V, but limited to prevent damaged equipment. Thus, the described embodiment will provide a continuous power source during the suppression of a transient voltage 130.

Figure 4:
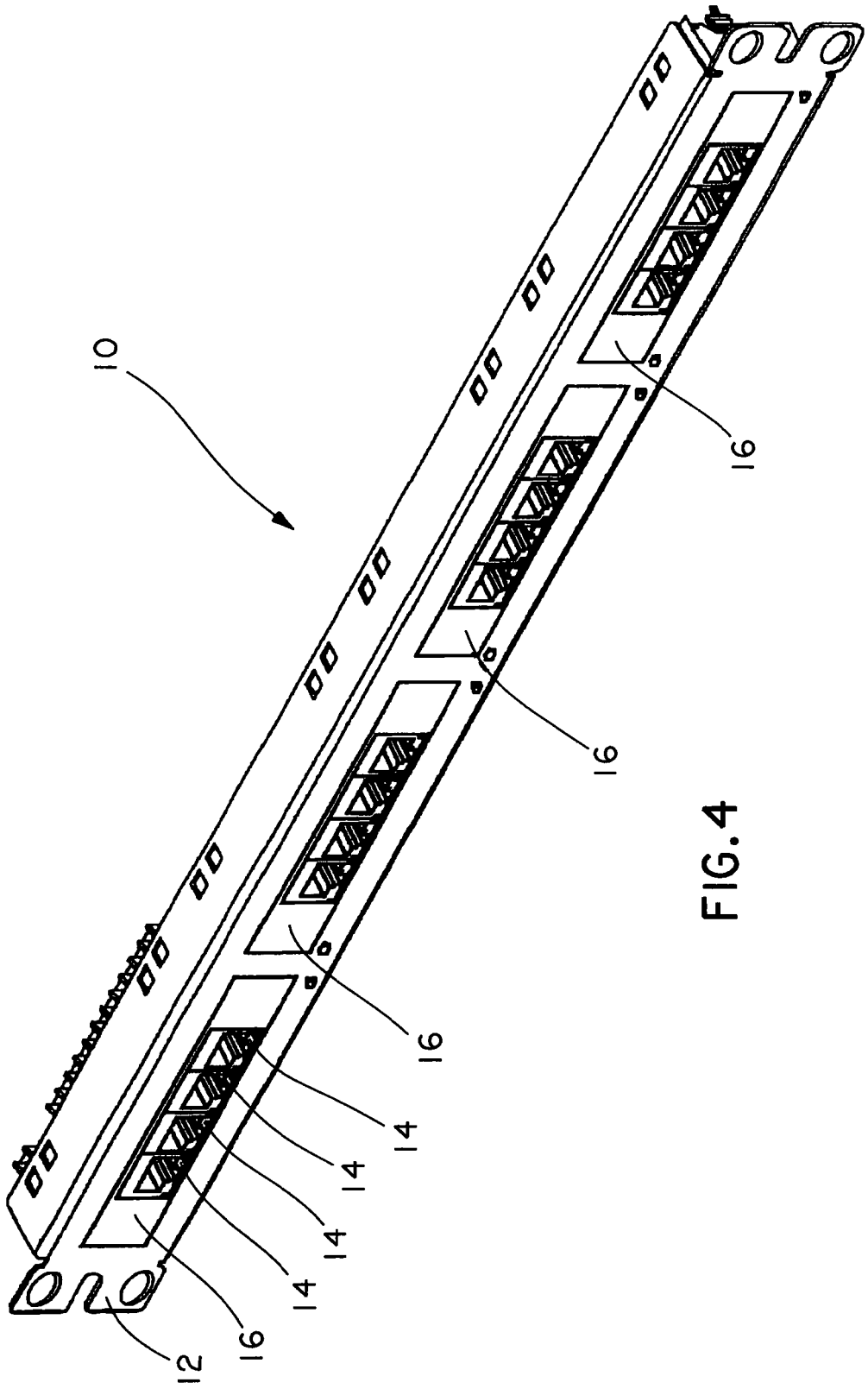
FIG. 4 is an assembled view of a transient voltage suppression patch panel.

FIG. 4 shows an assembled view of a preferred embodiment of a transient voltage suppression patch panel 10. The design shown may be installed in a network rack or cabinet. The transient voltage suppression patch panel 10 connects to the grounding strip of the rack or cabinet to route an excess transient voltage surge to ground.

Figure 5:
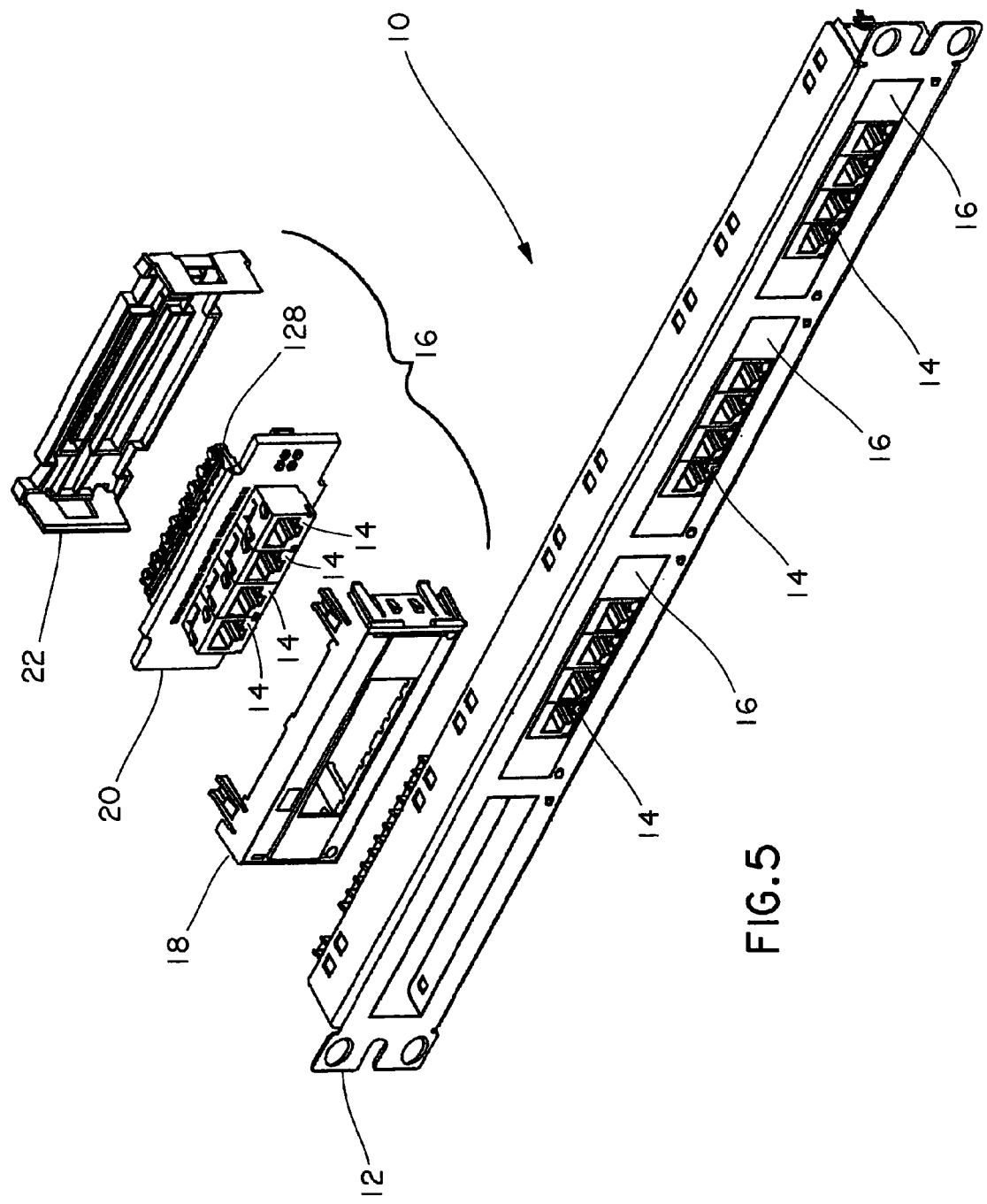
FIG. 5 is an exploded view of a transient voltage suppression patch panel.

FIG. 5 shows an exploded view of the voltage suppression patch panel 10. The components of the transient voltage suppression patch panel 10 include a metal frame 12 and four transient voltage suppression modules 16. The transient voltage suppression modules 16 include a plastic front bezel 18, a rear cover 22, and a transient voltage suppression circuit module 20. The transient voltage suppression circuit module 20 includes a circuit board with a standard jack module 14, such as an RJ45 jack module, and 110 punchdown connectors 128 mounted to the circuit board.

Figure 6A:
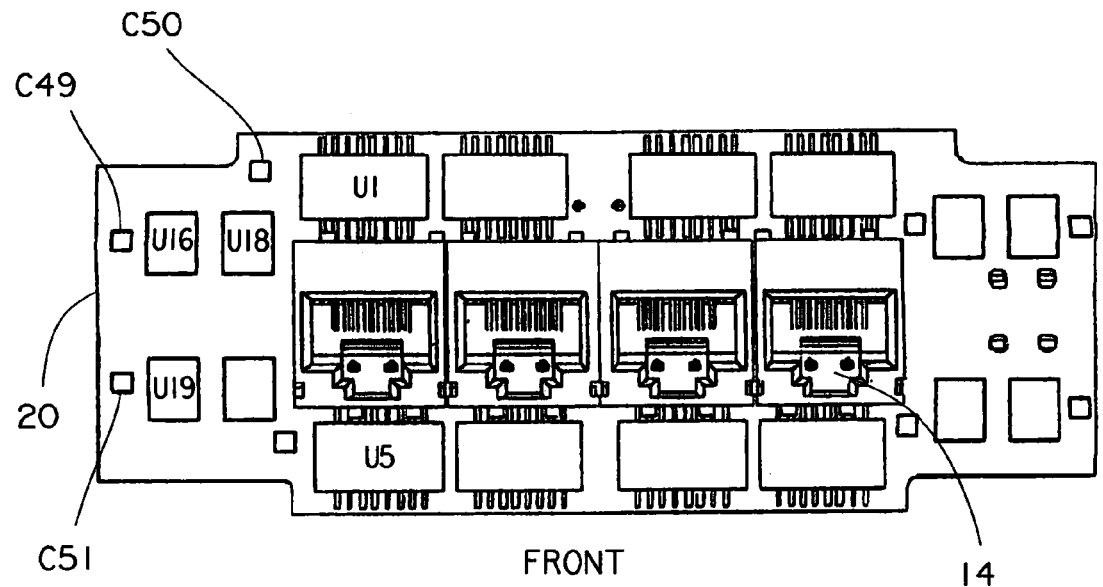
FIG. 6A is the front view of a transient voltage suppression circuit module.
Figure 6B:
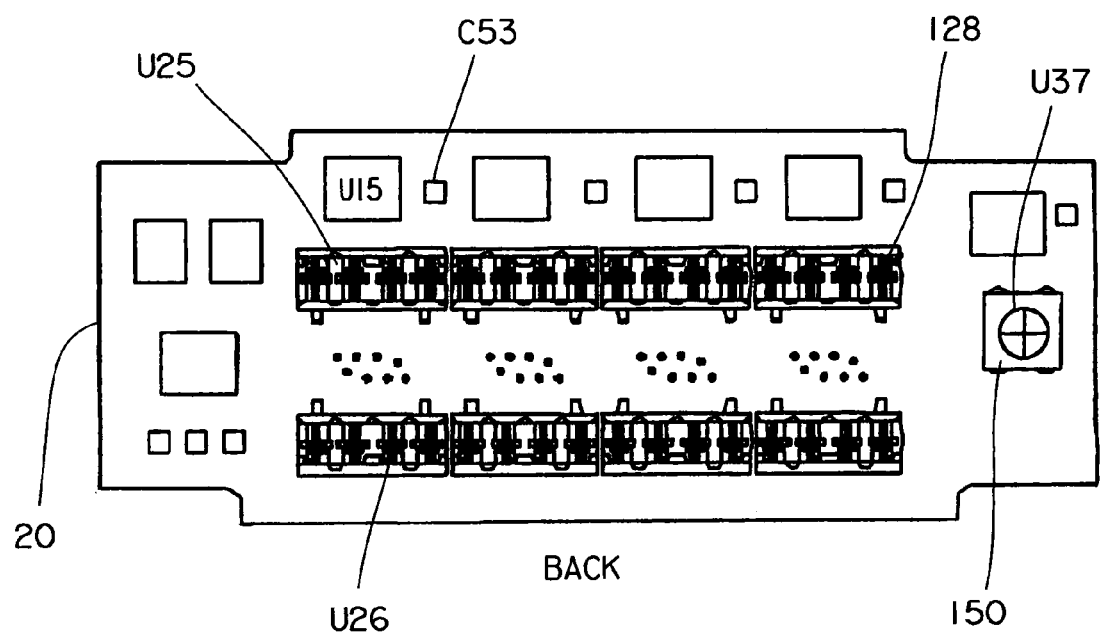
FIG. 6B is the back view of a transient voltage suppression circuit module.

FIG. 6A shows a front view of the transient voltage suppression circuit module 20, and FIG. 6B shows a back view of the transient voltage suppression circuit module 20. The connections on the front of the circuit module 20 include four RJ45 jacks that make up the standard jack module 14. The connections on the back of the circuit module 20 are 110 punchdown connectors 128. The standard jack module 14 is used to connect the transient voltage suppression circuit module 20 to the PoE power source 112, and the 110 punchdown connectors 128 are used to connect to the door controller 102. Although the preferred embodiment shows RJ45 jacks on the front and 110 punchdown connectors 128 on the back, other connector combinations are possible. The combination of RJ45 jacks and 110 punchdown connectors 128 facilitates Telecommunications Industry Association/Electronic Industries Alliance (TIA/EIA) compliance. FIG. 6B also shows a ground connection 150 facilitating transient voltage suppression with the transient voltage suppression patch panel 10 routing the excess transient voltage to ground.

Figure 7:
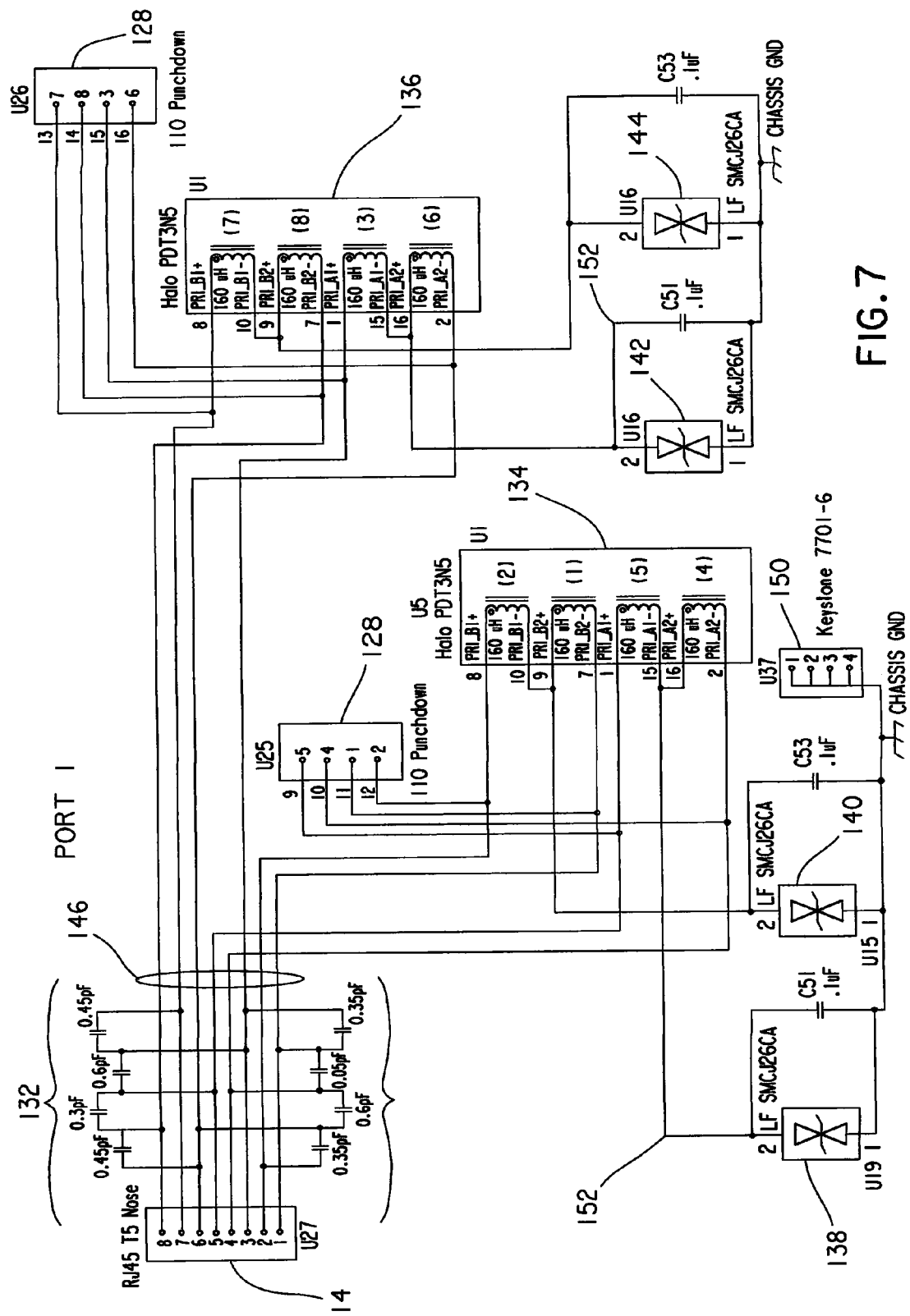
FIG. 7 is a schematic of a single port of a transient voltage suppression module.

FIG. 7 is a schematic of a single port of a transient voltage suppression module 16 that has a total of four ports. All of the ports use an identical schematic and have no intentional interaction between them other than the use of a common ground. Therefore, this schematic will be used as the description for all ports. TIA component category compliance ensures interoperability between devices that claim component category compliance. One unique aspect of this circuit is that the device is component compliant to CAT5E standards meeting the specifications for near end and far end crosstalk, return loss, insertion loss, TCL (loss from balanced signal to unbalanced signal at the near end of the cable), and TCTL (loss from balanced signal at the near end to unbalanced signal at the far end) defined in the TIA/EIA-568-B standard, etc. The specifications associated with CAT5E cable and its RJ45 connectors make it an excellent choice for use with 1000BASE-T, e.g., running Gigabit Ethernet for commercial building telecommunications cabling and the like. The prior art offering transient voltage suppression on data lines either does not claim category compliance or the category compliance claimed is questionable.

Referring to FIG. 7, the capacitors 132 shown between the data lines 146 of the RJ45 14 are located within the layers (embedded passes) of the transient voltage suppression circuit module 20 and are used to tune the circuit for CAT5E compliance. The current preferred embodiment is tuned only for CAT5E, but similar compensation circuitry capacitor, inductors, both discreet and distributed components, can also be used to tune the board for CAT6 or CAT6A compliance. These capacitors 132 are specifically added to the circuit for category compliance, but other features, such as the trace layouts on the transient voltage suppression circuit module 20 and 110 punchdown connectors 128, also contribute to category compliance. The schematic includes components of the circuit and does not necessarily show all the interactive effects of components.

A feature of the design that contributes to the improved PoE surge protection performance is that each differential pair is connected together by a first frequency-variable impedance 134 (1-2, 4-5) and a second frequency-variable impedance 136 (3-6, 7-8). This inductor is chosen so that it allows a respective differential pair to be shorted together at DC, but have high enough impedance that at CAT5E frequencies (1 MHz to 100 MHz) it appears as an open circuit. PoE has each of the pairs that provide power, shorted together at DC. Proper transient voltage protection is provided when each pair is connected together using two inductors, which can be a matched pair as shown parenthetically in the first frequency-variable impedance 134 and in the second frequency-variable impedance 136 for each differential pair.

Note that the schematic shown in FIG. 7 uses the primary windings of a transformer to provide the inductance required. This is implemented by using a toroidal ferrite with the wires of each individual differential pair wrapping around their own toroid. This increases the inductance of the configuration due to the magnetic interaction between both wires that make up a differential pair wrapping around the same toroidal ferrite. This is done for convenience, and this inductance can be accomplished through the use of any form of inductance that gives high enough impedance so that it is possible to pass CAT5E return loss requirements.

A vendor wanting to achieve transient voltage suppression for PoE may introduce inductances that may not be category compliant (e.g. Gigabit Ethernet compliance). In determining a properly sized inductor, there must be enough inductance to pass return loss requirements at low frequencies, but not so much as would create a circuit resonance in the desired frequency range that results in CAT5E non-compliance for Near-End Cross talk (NEXT) and return loss.

As an example, in FIG. 7, each inductor of the first frequency-variable impedance 134 and the second frequency-variable impedance 136 are individually 160 μH. When two of these inductors are connected together they more than double the inductance due to the magnetic interaction provided with the shared magnetic fields. This can be approximated by 500 μH between the two poles.

Using the formula for resonance $f=1/(2*pi*sqrt(L*C))$
For CAT5E (f=100 MHz), assuming L=500 μH,
C must be less than 5.0 fF.
For CAT6 (f=250 MHz), assuming L=500 μH,
C must be less than 0.8 fF.

In the preferred embodiment shown, C is a distributed capacitance within the toroidal inductors, which can be adjusted, at least to some degree, by adjusting the winding spacing on the toroid. Therefore, the preferred embodiment may be adjusted to meet performance requirements at a variety of operating frequencies. For the inductor shown in FIG. 7, there is resonance at about 150 MHz. Therefore, C is about 2.25 fF. Hence, this inductor works for CAT5E (up to 100 MHz) but not CAT6 (up to 250 MHz), although other circuit elements can be chosen according to the present invention which is compatible with CAT6, CAT6A and higher frequencies and/or data rates.

The first frequency-variable impedance 134 in FIG. 7 includes two toroidal transformers with the corresponding windings connected as shown, one for pair 1-2 and another for pair 4-5. Similarly, the second frequency-variable impedance 136 also includes two toroidal transformers with the corresponding windings connected as shown, one for pair 3-6 and another for pair 7-8. Each of these toroidal transformers includes an annular ferrite core with the corresponding inductors shown wrapped within each toroidal transformer. Consequently, there is a mutual inductance between the paired inductors of a transformer. Each of the first frequency-variable impedance 134 and the second frequency-variable impedance 136 can be a Halo/PBL part number TGSP-PDT3N5RL, although other transformer/inductor types can be substituted. Furthermore, the transformer/inductor types shown can generally be considered a frequency-variable impedance, which may be realized by other circuit element types.

Conductors 4 and 5 are shorted together at DC, and so are conductors 7 and 8, when these two conductor pairs are used for PoE. PoE systems are designed so that whenever two pairs that are used for PoE are shorted to ground, such a short is perceived as a short between the pairs, and the PoE power source 112 will briefly turn off in that event. Thus, when pairs 4-5 and 7-8 are used for PoE, clamping pairs 4-5 and 7-8 to ground in the event of a transient voltage surge will cause a PoE power source 112 to briefly turn off, because the PoE power source 112 senses that state as a short between the pairs. It is important for continued PoE operation in this example to prevent a PoE power source 112 from sensing an apparent short between pairs 4-5 and 7-8. This goal is accomplished in the illustrated design by clamping pairs 7-8 and 4-5 to a voltage other than ground in the event of a transient voltage. The same is true when pairs 1-2 and 3-6 are used for PoE.

The first diode 138, second diode 140, third diode 142, and fourth diode 144 are the diodes used in the circuit. PoE operates by having an approximate 48V differential between either pairs 3-6 and 1-2 or 4-5 and 7-8. PoE even allows two 2-pair PoE so that all pairs will have power passing through. Most prior art systems that provide transient voltage suppression are not designed with PoE in mind. Many transient voltage suppressors either are designed to start suppressing voltages around 5 to 7V or start suppressing voltage as high as 100V. All diodes must be chosen so that they activate at a high enough voltage to allow for PoE to operate, but at a low enough voltage so that they activate before any built in PoE protection. Diodes that turn on around 5 to 7V shunt the PoE operating at 48V. For PoE power sources 112 that have built in protection, the prior art is not designed to handle the transients of a 2400V/12A magnitude. Therefore, this transient protection device described must have protection that activates at voltages before the built in protection. Hence, the diodes that are chosen must activate when seeing a difference above 48V.

The first diode 138, second diode 140, third diode 142, and fourth diode 144 are 26V bi-directional diodes, such as avalanche diodes, that clamp at +26V and −26V. Herein, the avalanche diodes are clamped to the specified voltage that is high enough to allow for PoE to pass through the transient protection device while presenting the specified variable-voltage impedance low enough to provide protection. For example, in the PoE system shown, any transient voltage in excess of 52V will be shunted to ground. The diodes shown are bi-directional voltage suppression diodes, however other devices can be used and can also be generally thought of as voltage-variable impedances. Examples of such devices can be Littelfuse SMCJ Series transient voltage suppression diodes. Voltage-variable impedance can be achieved with a variety of device types such as avalanche diodes, zener diodes, metal oxide varistors, thyristors, and gas tubes. Although the diodes shown are suitable for current standard PoE, the values and circuit may be designed by one skilled in the art to comply with future PoE standards, which require higher clamping voltages, for example.

It is important for PoE that these diodes clamp to a voltage and do not short to ground. Shorting directly to ground causes the PoE to see a short between the pairs carrying the power when the transient voltage is passing through. This short causes the PoE switch or injector to briefly turn off while the short exists. In the present invention, clamping to a voltage and not to ground helps ensure continuous operation of the PoE system during the transient voltage.

In FIG. 7, U37 shows the ground connection 150. This diagram specifically shows the Keystone 7701-6, a four-pin screw used for grounding, although other similar grounding devices may be used.

In an alternative embodiment, the design can also incorporate an auxiliary signal 152 (e.g., fire alarm or burglar alarm) that can be sent over the Ethernet cabling on the non-PoE pairs from the circuit module 20 to the door controller 102 using a common-mode signaling technique. The auxiliary signal may be provided as a direct current signal via the conductor pairs. This embodiment includes blocking capacitors (not shown) that block the auxiliary signal from going to the network PoE power source 112.

In sum, this transient voltage suppression patch panel 10 advantageously provides transient voltage suppression in a combined PoE (DC voltages) and data line (AC voltages) system while maintaining Category compliance, particularly NEXT and return loss performance in the desired frequency range. This is accomplished by providing transient voltage suppression through a novel combination of a frequency-variable impedance connected between conductors in a pair, and a voltage-variable impedance connected to the frequency-variable impedance, where the voltage-variable impedance is also connected to a chassis and/or an electrical ground.

The voltage-variable impedance may comprise transient voltage suppression diodes including both a high voltage suppression operating limit and a low voltage suppression operating limit. Therein the voltage-variable impedance provides a low impedance outside of the high voltage suppression operating limit and outside of the low voltage suppression operating limit, with the voltage-variable impedance providing a high impedance between said high voltage suppression operating limit and said low voltage suppression operating limit. The transient suppression module alternatively may be included as part of a patch panel module comprising a first electrical connector having a plurality of first contacts and a second electrical connector having a plurality of second contacts, where each of said plurality of first contacts is connected to a respective one of said second contacts.

The foregoing may be provided as part of a transient voltage suppression electrical system that has a PoE power sourcing device including a first conductor and a second conductor, wherein said PoE power is supplied via the conductors. The power sourcing device may be one of a PoE injector and a PoE network switch. The patch panel module may include a circuit board containing the transient suppression module. The circuit board may have a first side and a second side, where the first electrical connector is mounted on said first side and the second electrical connector is mounted on said second side. The patch panel may be made to include one or more patch panel modules, the patch panel comprising a frame for mounting to a rack.

To this end, the present inventions include transient voltage suppression for PoE systems powered by one of a PoE injector and a PoE network switch. The transient voltage suppression may be included with rack mounted patch panels wherein each patch panel comprises a frame for mounting and one or more patch panel modules. Each patch panel module comprises one or more circuit boards with two sets of electrical connectors, where the patch panel modules may be connected serially between the power source and the rest of the Ethernet network. Each of the one or more circuit boards may comprise a transient suppression module as described.

The present invention may be used to protect PoE devices such as a PoE midspan, a PoE switch, a PoE patch panel, or many other PoE powered and non-PoE devices.

While the present invention has been illustrated by a description of various embodiments for providing transient voltage suppression on a Power over Ethernet system, and while these embodiments have been set forth in detail, it is intended that the scope of the invention be defined by the appended claims. It will be appreciated by those skilled in the art that modifications to the foregoing preferred embodiments may be made in various aspects. It is deemed that the spirit and scope of the invention encompass such variations to be preferred embodiments as would be apparent to one of ordinary skill in the art and familiar with the teachings of the present application.

What is claimed is:

1. A transient suppression module, comprising:
   a first conductor;
   a second conductor electrically parallel to said first conductor, said first conductor and said second conductor forming a differential pair;
   a frequency-variable impedance connected between said first conductor and said second conductor, wherein said frequency-variable impedance comprises a first inductor connected to a second inductor and a mutual inductance between said first inductor and said second inductor; and
   a voltage-variable impedance connected to said frequency-variable impedance, said voltage-variable impedance connected to at least one of a chassis and an electrical ground.

2. The transient suppression module of claim 1, wherein said transient suppression module has an operating frequency range, said frequency-variable impedance comprising a low impedance at a low end of said frequency range and a high impedance at a high end of said frequency range.

3. The transient suppression module of claim 1, wherein said frequency-variable impedance comprises a toroidal transformer with a ferrite wrapped with said first inductor and said second inductor.

4. The transient suppression module of claim 1, wherein said voltage-variable impedance is connected between said first inductor and said second inductor.

5. The transient suppression module of claim 4, wherein said voltage-variable impedance comprises transient voltage suppression diodes including both a high voltage suppression operating limit and a low voltage suppression operating limit.

6. The transient suppression module of claim 5, wherein said voltage-variable impedance comprises a low impedance outside of said high voltage suppression operating limit and outside of said low voltage suppression operating limit, said voltage-variable impedance further comprising a high impedance between said high voltage suppression operating limit and said low voltage suppression operating limit.

7. The transient suppression module of claim 6, wherein said high voltage suppression operation limit is +26V and said low voltage suppression operation limit is −26V.

8. A patch panel module including transient suppression, comprising:
   a first electrical connector having a plurality of first contacts;
   a second electrical connector electrically connected to said first electrical connector, said second electrical connector having a plurality of second contacts, where each of said plurality of first contacts is connected to a respective one of said second contacts; and
   a circuit board having a first side with said first electrical connector mounted thereon and a second side with said second electrical connector mounted thereon,
      said circuit board including a plurality of conductors, each of said plurality of conductors connecting said each of said plurality of first contacts to said respective one of said second contacts,
      said circuit board further including a transient suppression module for at least one pair of said plurality of conductors said at least one pair of said plurality of conductors forming a differential pair, said transient suppression module including a frequency-variable impedance directly connected between said at least one pair of said plurality of conductors, wherein said frequency-variable impedance comprises a first inductor connected to a second inductor and a mutual inductance between said first inductor and said second inductor, and a voltage-variable impedance connected to said frequency-variable impedance, said voltage-variable impedance connected to at least one of a chassis and an electrical ground.

9. The patch panel module of claim 8, wherein said transient suppression module has an operating frequency range, said frequency-variable impedance comprising a low impedance at a low end of said frequency range and a high impedance at a high end of said frequency range.

10. The patch panel module of claim 8, wherein said frequency-variable impedance comprises a toroidal transformer with a ferrite wrapped with said first inductor and said second inductor.

11. The patch panel module of claim 8, wherein said voltage-variable impedance is connected between said first inductor and said second inductor.

12. The patch panel module of claim 11 wherein said voltage-variable impedance comprises transient voltage suppression diodes including both a high voltage suppression operating limit and a low voltage suppression operating limit.

13. The patch panel module of claim 12, wherein said voltage-variable impedance comprises a low impedance outside of said high voltage suppression operating limit and outside of said low voltage suppression operating limit, said voltage-variable impedance comprising a high impedance between said high voltage suppression operating limit and said low voltage suppression operating limit.

14. A patch panel, comprising:
a frame for mounting to a rack;
a patch panel module including transient suppression connected to said frame, said patch panel module including:
a first electrical connector having a plurality of first contacts;
a second electrical connector electrically connected to said first electrical connector, said second electrical connector having a plurality of second contacts, where each of said plurality of first contacts is connected to a respective one of said second contacts; and
a circuit board having a first side with said first electrical connector mounted thereon and a second side with said second electrical connector mounted thereon,
said circuit board including a plurality of conductors, each of said plurality of conductors connecting said each of said plurality of first contacts to said respective one of said second contacts,
said circuit board further including a transient suppression module for at least one pair of said plurality of conductors, said at least one pair of said plurality of conductors forming a differential pair, said transient suppression module including a frequency-variable impedance directly connected between said at least one pair of said plurality of conductors, wherein said frequency-variable impedance comprises a first inductor connected to a second inductor and a mutual inductance between said first inductor and said second inductor, and a voltage-variable impedance connected to said frequency-variable impedance, said voltage-variable impedance connected to at least one of a chassis and an electrical ground.

15. The patch panel of claim 14, wherein said transient suppression module has an operating frequency range, said frequency-variable impedance comprising a low impedance at a low end of said frequency range and a high impedance at a high end of said frequency range.

16. The patch panel of claim 14, wherein said frequency-variable impedance comprises a toroidal transformer with a ferrite wrapped with said first inductor and said second inductor.

17. The patch panel of claim 14, wherein said voltage-variable impedance is between said first inductor connected and said second inductor.

18. The patch panel of claim 17, wherein said voltage-variable impedance comprises transient voltage suppression diodes including both a high voltage suppression operating limit and a low voltage suppression operating limit.

19. The patch panel of claim 18, wherein said voltage-variable impedance comprises a low impedance outside of said high voltage suppression operating limit and outside of said low voltage suppression operating limit, said voltage-variable impedance further comprising a high impedance between said high voltage suppression operating limit and said low voltage suppression operating limit.

20. An electrical system including transient suppression, comprising:
a PoE power sourcing device including a first conductor and a second conductor, wherein said PoE power is supplied via said first conductor and said second conductor, said first conductor and said second conductor forming a differential pair; and
a transient suppression module including a frequency-variable impedance directly connected between said first conductor and said second conductor, wherein said frequency-variable impedance comprises a first inductor connected to a second inductor and a mutual inductance between said first inductor and said second inductor, and a voltage-variable impedance connected to said frequency-variable impedance, said voltage-variable impedance connected to at least one of a chassis and an electrical ground.

21. The electrical system of claim 20, wherein said PoE power sourcing device is one of a PoE injector and a PoE network switch.

22. The patch panel of claim 21, wherein said voltage-variable impedance comprises transient voltage suppression diodes including both a high voltage suppression operating limit and a low voltage suppression operating limit.

23. The patch panel of claim 22, wherein said voltage-variable impedance comprises a low impedance outside of said high voltage suppression operating limit and outside of said low voltage suppression operating limit, said voltage-variable impedance comprises a high impedance between said high voltage suppression operating limit and said low voltage suppression operating limit.

24. The patch panel of claim 22, wherein said transient voltage suppression diodes comprise avalanche diodes clamped to a specified voltage as being high enough to allow for PoE power to pass through the transient suppression module, while presenting the specified voltage as low enough to provide protection which is activated by way of the avalanche diodes prior to activation of protection circuitry provided as part of the PoE network switch or PoE injector circuitry.

25. A method of providing transient suppression in a patch panel module, said method comprising the steps of:
providing a first electrical connector having a plurality of first contacts and a second electrical connector for electrically connecting to said first electrical connector via a plurality of second contacts, where each of said plurality of first contacts is connected to a respective pair of said second contacts;

electrically connecting said first electrical connector to said second electrical connector with a circuit board having a first side with said first electrical connector mounted thereon and a second side with said second electrical connector mounted thereon;

directly coupling at least one pair of one of said plurality of first contacts and said respective pair of said plurality of second contacts with a frequency-variable impedance, wherein said frequency-variable impedance comprises a first inductor connected to a second inductor and a mutual inductance between said first inductor and said second inductor, said at least one pair forming a differential pair; and connecting a voltage-variable impedance between said frequency-variable impedance and at least one of a chassis and electrical ground.

26. A Power over Ethernet device including transient voltage suppression, said Power over Ethernet device comprising:

a powered circuit having a first conductor and a second conductor, said first conductor and said second conductor forming a differential pair, and a transient suppression circuit connected to said powered circuit, said transient suppression circuit including a frequency-variable impedance directly connected between said first conductor and said second conductor, wherein said frequency-variable impedance comprises a first inductor connected to a second inductor and a mutual inductance between said first inductor and said second inductor, and a voltage-variable impedance connected to at least one of a chassis and an electrical ground.

27. The Power over Ethernet device of claim 26 wherein said Power over Ethernet device is one of a Power over Ethernet midspan, a Power over Ethernet switch, a Power over Ethernet patch panel and a Power over Ethernet powered device.

* * * * *

UNITED STATES PATENT AND TRADEMARK OFFICE
CERTIFICATE OF CORRECTION

PATENT NO.        : 8,576,532 B2
APPLICATION NO.   : 12/332900
DATED             : November 5, 2013
INVENTOR(S)       : Frank M. Straka et al.

It is certified that error appears in the above-identified patent and that said Letters Patent is hereby corrected as shown below:

In the Claims

Column 8, line 15 which reads "…a frequency-variable impedance connected between said first conductor…." should read "…a frequency-variable impedance directly connected between said first conductor…."

Signed and Sealed this
Seventh Day of October, 2014

Michelle K. Lee
*Deputy Director of the United States Patent and Trademark Office*